United States Patent
Sauter et al.

(10) Patent No.: US 8,966,607 B2
(45) Date of Patent: Feb. 24, 2015

(54) DEVICE PROGRAMMABLE NETWORK BASED PACKET FILTER

(75) Inventors: Martin Sauter, Markdorf (DE); Ed Illidge, Kanata (CA); Wayne Wei Ding, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 785 days.

(21) Appl. No.: 12/503,266

(22) Filed: Jul. 15, 2009

(65) Prior Publication Data

US 2011/0016519 A1 Jan. 20, 2011

(51) Int. Cl.
G06F 21/00 (2013.01)
H04L 29/06 (2006.01)
H04W 12/08 (2009.01)

(52) U.S. Cl.
CPC .......... H04L 63/0236 (2013.01); H04L 63/101 (2013.01); H04W 12/08 (2013.01); H04L 63/1416 (2013.01)
USPC ................................... 726/13; 726/1; 726/11

(58) Field of Classification Search
USPC .................................. 726/11, 13, 1
See application file for complete search history.

(56) References Cited

U.S. PATENT DOCUMENTS

| | | | | |
|---|---|---|---|---|
| 7,545,767 B2* | 6/2009 | Zhao et al. | ..................... | 370/328 |
| 7,865,752 B2* | 1/2011 | Brabenac | ..................... | 713/323 |
| 2003/0081607 A1 | 5/2003 | Kavanagh | | |
| 2004/0076155 A1 | 4/2004 | Yajnik et al. | | |
| 2004/0172557 A1 | 9/2004 | Nakae et al. | | |
| 2004/0193912 A1 | 9/2004 | Li et al. | | |
| 2005/0165917 A1 | 7/2005 | Le et al. | | |
| 2006/0253900 A1* | 11/2006 | Paddon et al. | ................... | 726/11 |
| 2007/0147380 A1 | 6/2007 | Ormazabal | | |
| 2008/0043739 A1 | 2/2008 | Suh et al. | | |
| 2008/0109890 A1* | 5/2008 | Bahl et al. | ....................... | 726/11 |
| 2009/0228972 A1* | 9/2009 | Bandi et al. | ..................... | 726/14 |

FOREIGN PATENT DOCUMENTS

| | | |
|---|---|---|
| CN | 1614565 A | 5/2005 |
| CN | 101141453 A | 3/2008 |
| JP | 2006-270894 A | 10/2006 |
| JP | 2007-513551 A | 5/2007 |

OTHER PUBLICATIONS

"Netgear Wireless-G Router WGR614v9 Reference Manual" from May 2008. ©2008 Netgear Inc. (116 pages total).*
"Belkin High-Speed Mode Wireless G Router User Manual [F5D7231-4]" ©2004 Belkin Corp. (133 pages total).*

(Continued)

*Primary Examiner* — Joseph P Hirl
*Assistant Examiner* — Thomas Gyorfi
(74) *Attorney, Agent, or Firm* — Christopher & Weisberg, P.A.

(57) ABSTRACT

A method is provided for filtering unwanted packets in a communication system. The communication system includes a first network, a wireless network and at least one wireless communication device. An instruction to add an entry to a blocked list is received from a specific wireless device. The entry includes blocking criteria. A first packet is received from the first network. The first packet is destined for the specific wireless communication device. If the first packet exhibits the blocking criteria included in the blocked list, the first packet is discarded before it can be distributed by the wireless network.

16 Claims, 5 Drawing Sheets

(56) References Cited

OTHER PUBLICATIONS

"D-Link DIR-655 User Manual Version 1.0" Dated Aug. 18, 2006. ©2006 D-Link Corp./D-Link Systems Inc. (96 pages total).*
"Linksys Wireless-G Broadband Router User Guide, Model No. WRT54G" ©2003 Cisco Systems Inc (84 pages total).*
Cowart, Robert et al. "Special Edition Using Microsoft® Windows® XP Professional, Third Edition" ©2004 Que Publishing Inc. Excerpts from Chapters 17, 18, and 24 (pp. 607-611, 741-746, 794, 795, 802, 825, and 826).*
Trapani, Gina. "Geek to Live: Set up a home wireless network" Published Mar. 24, 2006, ©2006 Lifehacker.com (5 pages total) http://lifehacker.com/162754/geek-to-live--set-up-a-home-wireless-network.*
Winn Schwartau. "Some exercises for improving your security posture" Published Nov. 1, 1999 on NetworkWorldFusion (3 pages) http://www.networkworld.com/archive/1999b/1101schwartau.html.*
J. Postel, ed. "RFC 793: DOD Standard Transmission Control Protocol" Published Sep. 1981. (85 pages) http://www.rfc-editor.org/rfc/pdfrfc/rfc793.txt.pdf.*
ZoneAlarm documentation compiled between Apr. 12, 2001 and Jun. 4, 2001 ©1999-2001 Zone Labs Inc. Full PDF from http://web.archive.org/web/20061004001032/http://www.cogeco.ca/files/pdf/internetconn_userguides/za.pdf.*
Wikipedia article for "Port scanner" published Jun. 16, 2009 (6 pages) http://en.wikipedia.org/w/index.php?title=Port_scanner&oldid=296684144.*
Steve Gibson. "Shields UP!! Faq—Frequently Asked Questions" ©2003 Gibson Research Corp. (9 pages) http://web.archive.org/web/20031207160552/http://grc.com/faq-shieldsup.htm.*
Steve Gibson. "Shields UP!! Windows Networking 101" ©2003 Gibson Research Corp. (2 pages) http://web.archive.org/web/20031008184407/http://grc.com/su-explain.htm.*
Steve Gibson. "Shields UP!! Network Bondage" ©2003 Gibson Reseach Corp. (4 pages) http://web.archive.org/web/20031001185806/http://grc.com/su-bondage.htm.*
"ZoneAlarm PRO User's Manual" ©2002 Zone Labs (145 pages) http://download.zonealarm.com/bin/media/pdf/ZAP31_manual.pdf.*
European Search Report dated Nov. 4, 2010 for European Application No. 10169393.5, European Filing Date: Jul. 13, 2010 consisting of 6-pages.
D-Link: "D-Link AirPlus xtreme G DI-624 Manual Version 1.06", Chapter: Using the Configuration Menu, Nov. 10, 2004, pp. 1-97, XP002606424.
dslreports.com: "Di-624 and UPnP" Jun. 7, 2005, pp. 1-4, XP002606425, Retrieved from the Internet: URL:http://www.dslreports.com/forum/remark, 13256090, pp. 1-4, [retrieved on Oct. 20, 2010], XP-002606425.
International Search Report and Written Opinion dated Nov. 1, 2010 for International Application No. PCT/CA2010/001090, International Filing Date: Jul. 14, 2010 consisting of 9-pages.
1st Chinese Examination Report and Search Report in both Chinese and its English translation dated Jan. 23, 2014 for corresponding Chinese National Stage Application Serial No. 201080038824.8, Chinese National Stage Entry Date: Feb. 24, 2012, consisting of 22 pages.
1st Japanese Office Action in both Japanese and its English translation dated Apr. 30, 2014 for corresponding Japanese National Stage Application Serial No. 2012-519855, Japanese National Stage Entry Date: Jan. 13, 2012 consisting of 6 pages.
2nd Chinese Examination Report in both Chinese and its English translation dated Jul. 22, 2014 for corresponding Chinese National Stage Application Serial No. 201080038824.8, Chinese National Stage Entry Date: Feb. 24, 2012, consisting of 18 pages.

* cited by examiner

DEVICE PROGRAMMABLE NETWORK BASED PACKET FILTER

CROSS-REFERENCE TO RELATED APPLICATION

N/A

STATEMENT REGARDING FEDERALLY SPONSORED RESEARCH OR DEVELOPMENT

N/A

FIELD OF THE INVENTION

The present invention relates generally to communication systems and more specifically to a method, system and apparatus for filtering unsolicited packets in a wireless communication system that is programmable by the targeted device.

BACKGROUND OF THE INVENTION

Enhancing network security is an important consideration for any network provider. Malicious software, such as viruses, Trojan horses, worms, etc., can wreak havoc on even the most robust system. Additionally, unwanted solicitations, such as spam email or pop-ups unnecessarily consume needed bandwidth and tax resources of the network.

Historically, wireless networks, such as Universal Mobile Telecommunications System ("UMTS"), Code Division Multiple Access ("CDMA"), Worldwide Interoperability for Microwave Access ("WiMAX"), Long Term Evolution ("LTE"), etc., have been relatively free from such unsolicited attacks. However, with the ever-increasing number of wireless and/or mobile device users, even these devices are now becoming targeted. This problem is even more troublesome for wireless networks as the bandwidth is considerably limited. Additionally, service providers often charge for mobile service on a per use or per data basis whereby the user actually has to pay for receiving items he/she does not want and has not requested.

Today, devices that are connected to the Internet via a wireless network are usually protected from unsolicited packets via Network Address Translation ("NAT"). The NAT server is usually positioned on the gateway between the Internet and the wireless network, e.g., as a Gateway General Packet Radio Service ("GPRS") Support Node ("GGSN"), Packet Data Gateway ("PDG"), etc. However, some network operators do not use NAT and assign public Internet Protocol ("IP") addresses. In this environment, the wireless device is often continuously "bombarded" with unsolicited IP packets from many sources. Such sources, for example, may include (1) peer-to-peer ("P2P") clients that send IP packets to an IP address which was previously assigned to another device due to dynamic IP address assignment and (2) hosts on the Internet that are infected by viruses or other malicious programs that randomly send malicious packets to other hosts to try to infect them.

On a well maintained wireless device, the IP protocol stack or the firewall detects and discards such unwanted data packets. However, these packets create a number of serious issues in wireless networks. In Fourth-generation ("4G") networks where all devices are always connected and each device has an IP address, there are approximately 1000-2000 devices connected to the same cell at any time. If all of these devices constantly receive unsolicited packets, the signaling for channel establishments and bandwidth overhead on the air interface is significant. By comparison, for a digital subscriber line ("DSL"), only a single household is behind a link.

Additionally, unsolicited packets have a further negative effect on the battery life of the wireless device. Because the wireless device must have its radio powered on to receive messages, the presence of these unwanted packets significantly shorten the periods during which wireless devices can power down their radio to conserve power. Reception of periodic unsolicited packets does not only require power for the reception of the packet but also for radio connection establishment and maintaining the channel for some time after the packet has been received. As a result, the operation time of the wireless device is significantly reduced by reception of periodic but unwanted IP packets.

With the introduction of Internet Protocol version 6 ("IPv6"), the next-generation Internet Layer protocol for packet-switched networks and the Internet, the problem is likely to get worse since NAT gateways, which currently block all incoming packets unless the connection is setup by the wireless device, are no longer required.

One prior method involves the use of Deep Packet Inspection ("DPI") on the network side. However, DPI has limited capabilities to filter unwanted packets from the wireless device side since the DPI filter in the network has no understanding of which applications are really running on the device.

Therefore, what is needed is a method, system and apparatus for filtering unsolicited packets to a targeted wireless communication device in a wireless communication system.

SUMMARY OF THE INVENTION

The present invention advantageously provides a method, apparatus and system for filtering unwanted and/or unsolicited data packets in a communication network. Generally, a packet filter that is programmable by a wireless communication device detects and discards unwanted data packets before they can be distributed through a wireless network.

In accordance with one aspect of the present invention, a method is provided for filtering unwanted packets in a communication system. The communication system includes a first network, a wireless network and at least one wireless communication device. An instruction from a specific wireless device to add an entry to a blocked list is received. The entry includes blocking criteria. A first packet destined for the specific wireless communication device is received from the first network. If the first packet exhibits blocking criteria included in the blocked list, the first packet is discarded before the first packet can be distributed by the wireless network.

In accordance with another aspect of the present invention, a programmable packet filter filters unwanted packets in a communication system. The communication system includes a first network, a wireless network and a plurality of wireless communication devices. The programmable packet filter includes at least one communication interface and a filter module. The communication interface is operable to receive an instruction from a specific wireless device to add an entry to a blocked list. The entry includes blocking criteria. The communication interface is also operable to receive a first packet delivered through the first network. The first packet is destined for the specific wireless communication device. The filter module is electrically coupled to the at least one communication interface. The filter module is operable to determine whether the first packet exhibits the blocking criteria included in the blocked list, and if the first packet exhibits the blocking criteria included in the blocked list, discard the first packet before the first packet can be distributed by the wireless network.

In accordance with yet another aspect of the present invention, a wireless communication device is provided for use in a communication system. The communication system includes a first network, a packet filter and a wireless network. The wireless communication device includes a plurality of logical ports, a transceiver and a filter module. The transceiver is operable to receive at least one packet through one of the logical ports. The at least one packet originates from the first network. The filter module is electrically coupled to the transceiver. The filter module is operable to determine whether the at least one packet is targeted for a logical port used by a previously installed application which is currently running on the wireless communication device and, if the at least one packet is not targeted for a logical port used by a previously installed application, create a block request.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
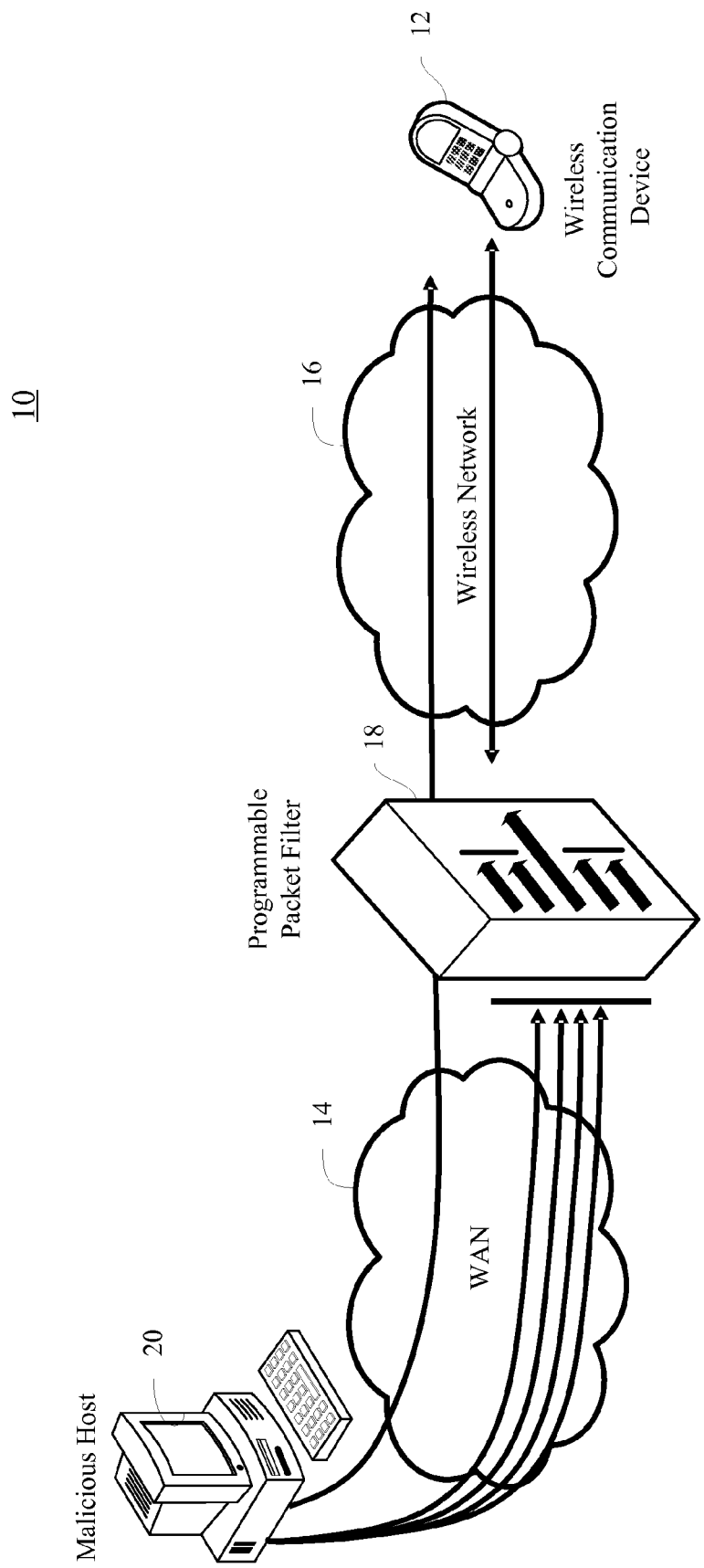
FIG. 1 is a block diagram of an exemplary wireless communication system with programmable packet filtering constructed in accordance with the principles of the present invention.

Before describing in detail exemplary embodiments that are in accordance with the present invention, it is noted that the embodiments reside primarily in combinations of apparatus components and processing steps related to implementing a system and method for filtering unsolicited packets in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term "Zigbee" relates to a suite of high level wireless communication protocols as defined by the Institute of Electrical and Electronics Engineers ("IEEE") standard 802.15.4. Further, "Wi-Fi" refers to the communications standard defined by IEEE 802.11. The term "WiMAX" means the communication protocols defined under IEEE 802.16. "Bluetooth" refers to the industrial specification for wireless personal area network ("PAN") communication developed by the Bluetooth Special Interest Group. "Ethernet" refers to the communication protocols standardized under IEEE 802.3.

One embodiment of the present invention advantageously provides a method, apparatus and system for filtering unsolicited packets in a wireless communication system. In one embodiment, a wireless device uses a plug-in into the protocol stack, such as a Transmission Control Protocol/Internet Protocol ("TCP/IP") stack, of the machine to detect unsolicited and unwanted incoming Internet Protocol ("IP") packets from sources such as peer-to-peer ("P2P") hosts, viruses, etc. The plug-in is aware of the protocol ports, e.g., such as Transmission Control Protocol ("TCP") and User Datagram Protocol ("UDP") ports, used by the wireless communication device applications and which ports are not used at all. The TCP and UDP ports do not belong to the plug-in. Instead, these ports are administered by the TCP/IP protocol stack as part of the operating system. Thus applications do not have to be rewritten and the operating system does not have to be modified as the plug-in is transparent, i.e. it is part of the protocol stack. The plug-in infrastructure in different operating systems, for example, allows network tracers to scan all incoming traffic before it is forwarded to the IP and TCP/UDP part of the protocol stack. For open connections, the plug-in may also detect if packets arrive which do not belong to the connection established on that port.

When the plug-in on the wireless device detects unwanted packets, it sends a request to a network-based packet filter device which blocks such packets targeted for the wireless device. Blocking rules may be based on destination TCP or UDP ports, originating TCP or UDP ports, originating IP addresses, IP address ranges, and potentially further criteria. Referring now to the drawing figures in which like reference designators refer to like elements, there is shown in FIG. 1 an exemplary arrangement of a communication system 10 constructed in accordance with the principles of the present invention. Communication system 10 includes at least one wireless communication device 12 connected to a wide-area network ("WAN") 14, such as the Internet, through a wireless network 16. The wireless communication device 12 may include a cellular telephone, a smart phone, a wireless personal digital assistant ("PDA"), a laptop computer, a notebook computer, a desktop computer having wireless connectivity, a handheld game system, etc. A programmable packet filter 18 is connected between the WAN 14 and the wireless network 16 and filters unsolicited and/or unwanted packets sent, for example, from a malicious host computer 20, and prevents these packets from being distributed before reaching the wireless network 16. Criteria for determining unwanted packets are established, e.g., programmed in the packet filter 18, by the wireless communication device 12. Additionally, default filter rules may also be resident in the packet filter 18 as part of the system.

The wide area network 14 may include the Internet, intranet, or other communication network. Although the communication network is shown in FIG. 1 as a WAN, the principles of the present invention may also apply to other forms of communication networks, such as personal area networks ("PANs"), local area networks ("LANs"), campus area networks ("CANs"), metropolitan area networks ("MANs"), etc. Additionally, WAN 14 may be wired, wireless, or a combination thereof.

The wireless network 16 may operate according to such communication protocols as Wi-Fi, Wi-Max, Zigbee, Bluetooth, Orthogonal Frequency Division Multiplexing ("OFDM"), Code Division Multiple Access ("CDMA"), Wideband-CDMA ("W-CDMA"), Time Division Multiple Access ("TDMA"), Global System for Multiple Access ("GSM"), Enhanced Data Rates for GSM Evolution ("EDGE"), Long-Term Evolution ("LTE"), Evolution-Data Optimized ("EVDO"), Ultra Mobile Broadband ("UMB"), etc.

Figure 2:
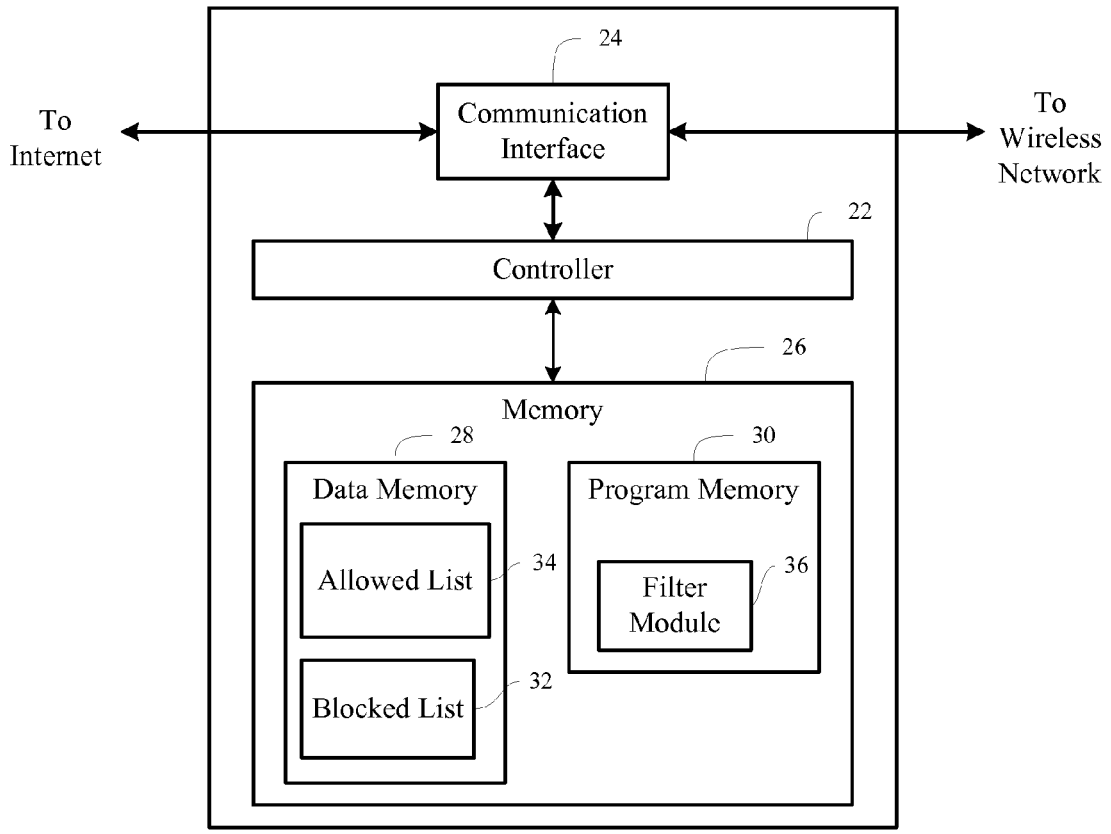
FIG. 2 is a block diagram of an exemplary programmable packet filter constructed in accordance with the principles of the present invention.

Referring now to FIG. 2, an exemplary programmable packet filter 18 may include a controller 22 (e.g., a processor or microprocessor), one or more communication interfaces 24 (one shown), and a memory 26 (which may include non-volatile memory, volatile memory, or a combination thereof). The controller 22 controls transfer of data to and from memory 26, communication of stored data to other devices, and general operation of applications and other functions of the packet filter 18.

The memory 26 may include a data memory 28 and a program memory 30. The data memory 28 may include a blocked list 32 and/or an allowed list 34. The blocked list 32 includes destination TCP or UDP ports, originating IP addresses, and or further packet identifying criteria to block unwanted packets for each wireless communication device 12 served by the packet filter 18. Likewise, in an alternative embodiment, the allowed list 34 includes destination TCP or UDP ports, originating IP addresses, and or further packet identifying criteria to allow desired packets for each wireless communication device 12 served by the packet filter 18. The program memory 30 includes a filter module 36 which filters unsolicited and/or unwanted packets received from the WAN 14 based on the blocked list 32 before reaching the wireless network 16 and/or passes approved packets based on the allowed list 34 through to the wireless network 16. Operation of the filter module 36 is described in greater detail below.

It should be noted that other features commonly found in a networking device may also be included in the programmable packet filter 18; however, only those elements that are relevant to understanding the present invention are shown in FIG. 2.

Figure 3:
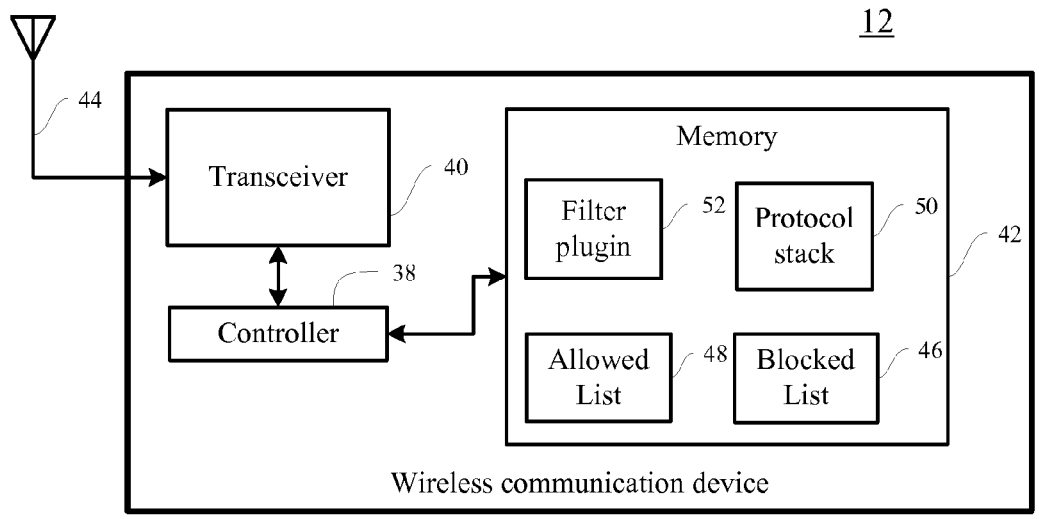
FIG. 3 is a block diagram of an exemplary wireless communication device constructed in accordance with the principles of the present invention.

Referring now to FIG. 3, an exemplary wireless communication device 12 may include a controller 38 (e.g., a processor or microprocessor), a transceiver 40, and a memory 42 (which may include non-volatile memory, volatile memory, or a combination thereof). The controller 38 controls radio communications, storage of data to memory 42, and operation of applications and general functionality of the wireless communication device 12.

The transceiver 40 may be electrically coupled to one or more antennas 44. The transceiver 40 transmits and receives radio frequency signals in a well-known manner. The transceiver 40 may operate using one or more known communication protocols, including but not limited to, Wi-Fi, Wi-Max, Zigbee, Bluetooth, CDMA, TDMA, GSM, EDGE, LTE, EVDO, UMB, IPv6, etc.

The memory 42 may include a blocked list 46 and/or an allowed list 48. Similar to the blocked list 32 of the packet filter 18, the blocked list 46 includes destination TCP or UDP ports, originating IP addresses, and or further packet identifying criteria to block unwanted packets for the wireless communication device 12. Likewise, the allowed list 48 includes destination TCP or UDP ports, originating IP addresses, and or further packet identifying criteria to allow desired packets for the wireless communication device 12. The memory 42 may also include a protocol stack 50 and a filter plug-in 52 which identifies unsolicited and/or unwanted probe packets received from the WAN 14 and instructs the programmable packet filter 18 to block further packets having the identified criteria. Operation of the filter plug-in 52 is described in greater detail below.

Figure 4:
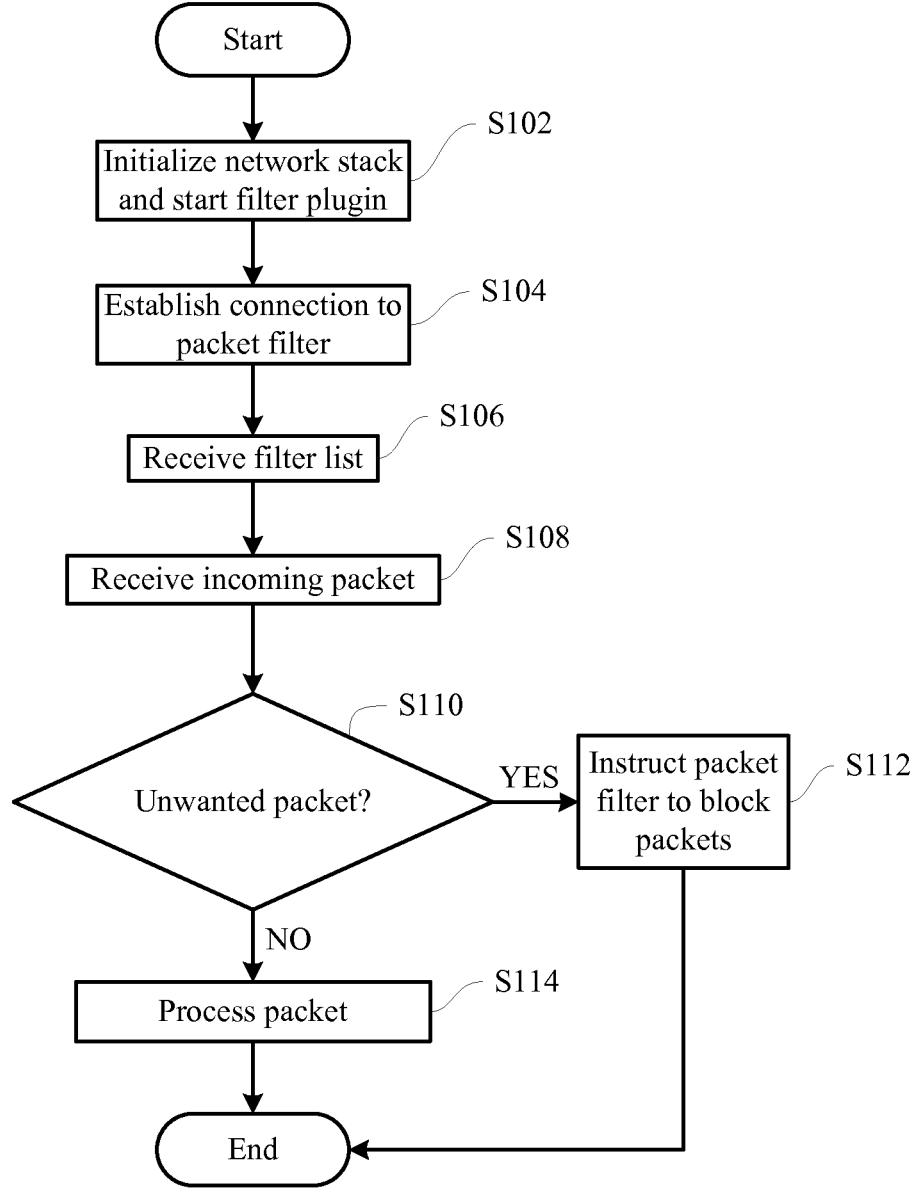
FIG. 4 is a flow chart of an exemplary unsolicited packet detection process implemented by a wireless communication device according to the principles of the present invention.

Referring now to FIG. 4, a flowchart is provided that describes exemplary steps performed by the wireless communication device 12 to identify unsolicited and/or unwanted packets and program the packet filter 18. The wireless communication device 12 begins the process upon startup by initializing the TCP/IP network stack and the connection to the wireless network 16 and starting the filter plug-in 52 (step S102). It should be noted that although the filter process is described herein as being implemented in the form of a plug-in, the process could also conceivably be implemented as a stand-alone module, or as a part of the network protocol stack or as a part of the general operating system.

When the wireless communication device 12 is connected to the wireless network 16, the filter plug-in 52 establishes a signaling connection to the network-based packet filter 18 (step S104). At this point, the wireless communication device 12 may receive, from the packet filter 18, a listing of all the filters that have been put in place by the wireless communication device 12 during the last communication session (step S106). Alternatively, the blocked filter list 32 in the packet filter 18 could be reset (by either the filter plug-in 52 or the filter module 36) and all existing entries deleted. Additionally, the wireless network 16 may create a list of default filters and inform the wireless device 12 these filters so that the wireless device 12 can delete them if required.

The filter plug-in 52 monitors incoming packets (step S108). Based on its knowledge of running applications as described above, the filter plug-in 52, in combination with the protocol stack 50, detects unwanted packets (step S110) and instructs the packet filter 18 to block such packets (step S112). As an example, the filter plug-in 52 could send a block request when only a single packet for a certain port from a certain host arrives or it could wait for several similar incoming packets before requesting that subsequent packets be blocked. If the packet does not meet the criteria of the blocked list 46, or meets the criteria but is on the allowed list 48, the packet is treated as a wanted packet and is processed by an associated application (step S114). The system could also be set up such that there is only a blocked list 46, thus all packets not on the blocked list 46 would be allowed automatically.

Ideally, the blocked list 46 should only include entries for blocking ports associated with applications currently running on the wireless communication device 12. In other words, the blocked list 46 is updated to reflect the current state of the wireless communication device 12 as close to real time as possible. Thus, if a program was previously installed but is not running, the packet filter 18 in the network is instructed to reject the packet. However, if the program is running, no blocking instruction is sent.

Packets may be blocked based on a combination of the source IP address, and source/destination TCP or UDP port. The packet filter 18 may also filter complete IP address ranges. In other words, instead of only blocking one IP address, a filter entry may block all IP addresses in a specified range, e.g., between 10.0.0.0 and 10.0.0.255. Range blocking may be implemented by using so called "network masks" or any kind of ranges, e.g. 10.0.0.23-10.0.0.27 (which could not be described with a network mask).

Figure 5:
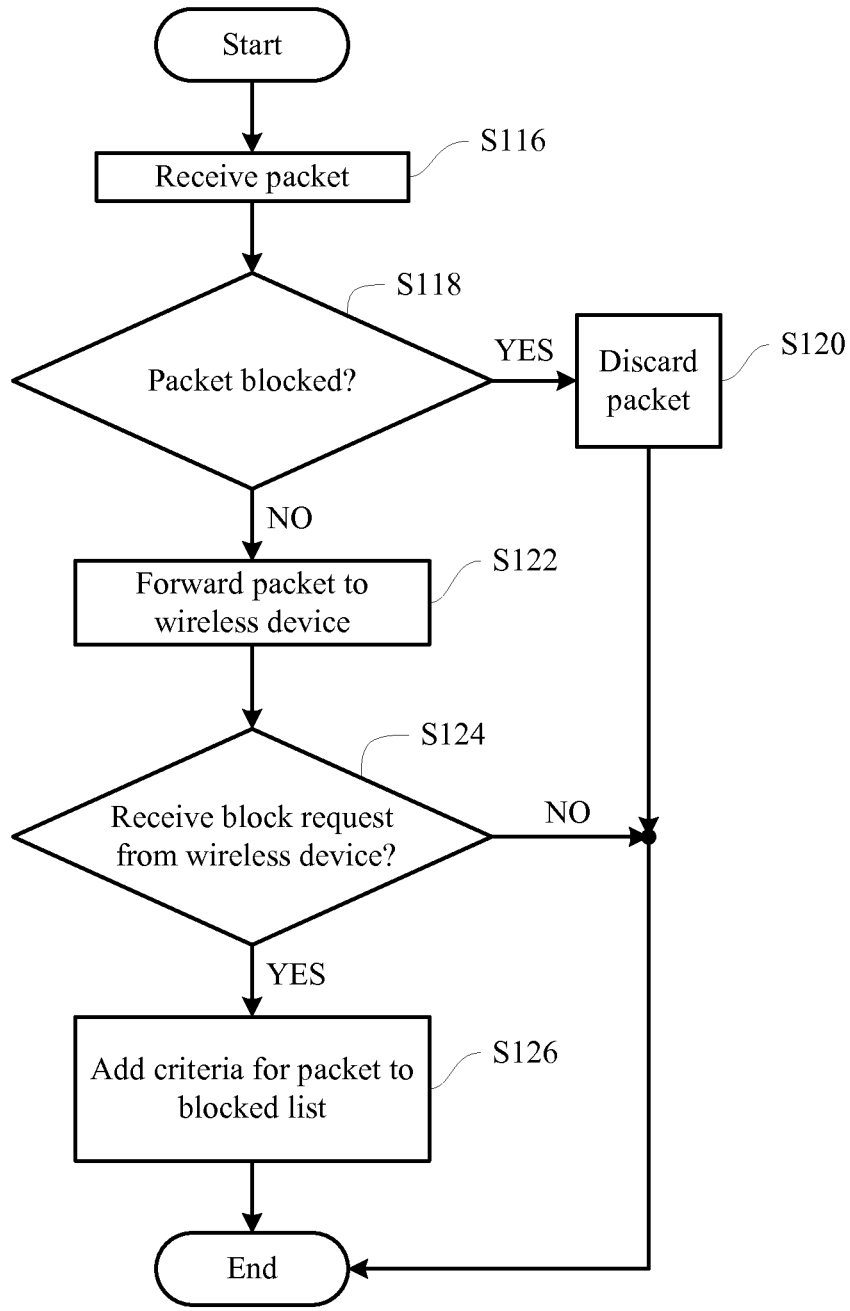
FIG. 5 is a flow chart of an exemplary packet filtering process implemented by a programmable packet filter according to the principles of the present invention.

Referring now to FIG. 5, a flowchart is provided that describes exemplary steps performed by the programmable packet filter 18 to filter unsolicited and/or unwanted packets before distribution on the wireless network 16. The packet filter 18 receives a probe packet, e.g., P2P or a packet sent from a virus, destined for the IP address of the wireless communication device 12 (step S116). If the filter module 36 recognizes the packet as being blocked, e.g., meets criteria of the blocked list 32, the packet filter 18 simply discards the packet (step S120) and the process ends. However, if the filter module 36 does not recognize the packet as being blocked, e.g., the criteria for blocking is not met by the corresponding parameters of the packet as established by the blocked list 32, the packet filter 18 forwards the probe packet on to the wireless communication device 12 through the wireless network 16 (step S122). If the protocol stack 50 of the wireless communication device 12 recognizes that the destination TCP/UDP port is not connected to an application, the wireless communication device 12 sends a block request to the network-based packet filter 18. The block request may be sent right away after receiving a single packet, or could be delayed until after receiving a predetermined number of packets. If the packet filter 18 receives a block request from the wireless communication device 12 (step S124), the filter module 36 adds the identified criteria to the blocked list 32 for the specific wireless communication device 12 (step S126). Thus, subsequent IP packets from the same host to the same TCP/UDP port are blocked by the packet filter 18. This reduces air interface signaling load and battery use of the wireless communication device 12. In other words, the available bandwidth on the air interface is increased and the operation time, i.e. battery life, of the wireless communication device 12.

Figure 6:
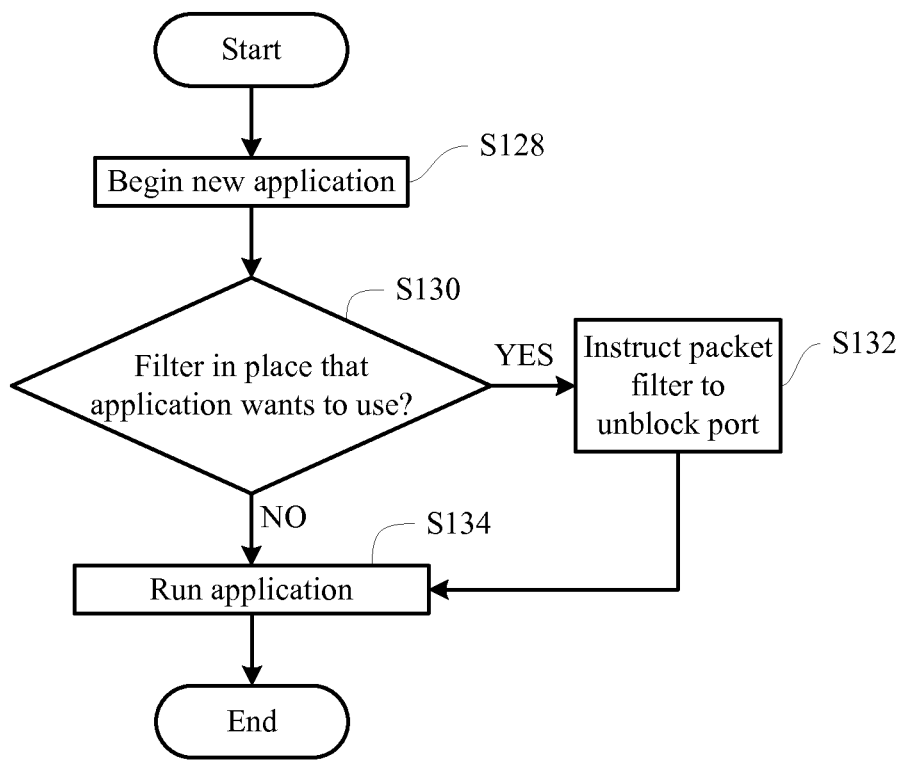
FIG. 6 is a flow chart of an exemplary packet unblocking process implemented by a wireless communication device according to the principles of the present invention.

Referring now to FIG. 6, a flowchart is provided that describes exemplary steps performed by the wireless communication device 12 to update the blocked list 46. When a new application that uses wireless communication starts on the wireless communication device 12 (step S128), the filter plug-in 52 is informed by the protocol stack 50. This notification is transparent to the application. If there is a filter for the TCP or UDP port in place that the application wants to use (step S130), the filter plug-in 52 sends an unblock request to the packet filter 18 (step S132). The application then proceeds or continues to run (step S134), as the updating process is transparent to the application. The network-based packet filter 18 acknowledges the new rule and filters the packets.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for filtering unwanted packets in a communication system, the communication system including a first network, a wireless network and at least one wireless communication device, the method comprising:
    at a packet filter:
        receiving an automatically-generated block request from a wireless communication device, the automatically-generated block request including blocking criteria, the blocking criteria indicating:
            that a previously installed application using a port previously unblocked by the packet filter is not running; and
            the previously unblocked port;
        receiving a first packet from the first network, the first packet destined for the wireless communication device;
        determining whether the first packet exhibits blocking criteria included in a blocked list;
        responsive to determining that the first packet exhibits blocking criteria included in the blocked list, discarding the first packet before the first packet can be distributed by the wireless network;
        receiving an automatically-generated unblock request from the wireless communication device indicating:
            that a new application is using a port previously blocked by the packet filter; and
            the previously blocked port; and
        forwarding subsequent packets destined to the previously blocked port in response to the unblock request.

2. The method of claim 1, wherein the blocking criteria included in the blocked list includes at least one of a destination Transmission Control Protocol ("TCP") port number, a destination User Datagram Protocol ("UDP") port number, an originating TCP port number, an originating UDP port number, an originating Internet Protocol ("IP") address, and a range of IP addresses.

3. The method of claim 1, wherein the wireless communication device creates a block request by:
    receiving at least one packet;
    automatically determining whether the at least one packet is targeted for a port used by the previously installed application, the previously installed application currently running on the wireless communication device; and
    responsive to determining that the at least one packet is not targeted for a port used by the previously installed application, automatically creating the block request without human intervention.

4. The method of claim 3, wherein determining whether the at least one packet is targeted for a port used by the previously installed application comprises checking a protocol stack for port assignments.

5. The method of claim 3, further comprising prior to creating the block request, receiving a predetermined amount of packets targeted for the port used by the previously installed application.

6. The method of claim 1, wherein the blocked list is programmable by the at least one wireless communication device without human interaction.

7. The method of claim 1, further comprising sending a list of default filters to the wireless communication device.

8. The method of claim 7, further comprising receiving from the wireless communication device a subset of the default filters to be deleted.

9. A programmable packet filter for filtering unwanted packets in a communication system, the communication system including a first network, a wireless network and at least one wireless communication device, the programmable packet filter comprising:
 at least one communication interface configured to:
  receive an automatically-generated block request from a wireless communication device, the automatically-generated block request including blocking criteria, the blocking criteria indicating:
   that a previously installed application using a port previously unblocked by the packet filter is not running; and
   the previously unblocked port;
  receive a first packet delivered through the first network, the first packet destined for the wireless communication device; and
 a filter module communicatively coupled to the at least one communication interface, the filter module configured to:
  determine whether the first packet exhibits blocking criteria included in a blocked list; and
  responsive to determining that the first packet exhibits the blocking criteria included in the blocked list, discard the first packet before the first packet can be distributed by the wireless network;
  receive an automatically-generated unblock request from the wireless communication device indicating:
   that a new application is using a port previously blocked by the packet filter; and
   the previously blocked port; and
  forward subsequent packets destined to the previously blocked port in response to the unblock request.

10. The programmable packet filter of claim 9, wherein the programmable packet filter is electrically coupled between the first network and the wireless network.

11. The programmable packet filter of claim 10, wherein the blocking criteria included in the blocked list includes at least one of a destination Transmission Control Protocol ("TCP") port number, a destination User Datagram Protocol ("UDP") port number, an originating TCP port number, an originating UDP port number, an originating Internet Protocol ("IP") address, and a range of IP addresses.

12. The programmable packet filter of claim 9, wherein the blocked list is programmable based on receipt of an instruction from at least one wireless communication device.

13. A wireless communication device for use in a communication system, the communication system including a first network, a packet filter in the first network, and a wireless network, the wireless communication device comprising:
 a plurality of logical ports;
 a transceiver configured to receive at least one packet through one of the logical ports, the at least one packet originating from the first network; and
 a filter module electrically coupled to the transceiver, the filter module configured to:
  determine whether the at least one packet is targeted for a logical port used by a previously installed application;
  determine whether the previously installed application is currently running on the wireless communication device;
  responsive to determining that the at least one packet is not targeted for a logical port used by a previously installed application:
   create a block request, the block request indicating a port to be blocked; and
   cause the block request to be transmitted to the packet filter to cause the packet filter to block the indicated port;
  responsive to determining that the previously installed application is not currently running on the wireless communication device, send an automatically-generated block request to the packet filter, the automatically-generated block request indicating the logical port used by the previously installed application; and
  responsive to a new application using the previously blocked port, send an automatically-generated unblock request to the packet filter, the unblock request indicating the previously blocked port.

14. The wireless communication device of claim 13, wherein the transceiver is further configured to program the packet filter by sending the block request to the packet filter without human intervention.

15. The wireless communication device of claim 13, further comprising:
 a protocol stack including port assignments for previously installed applications; and
 wherein the filter module determines whether the at least one packet is targeted for a port used by the previously installed application by checking the protocol stack for port assignments.

16. The wireless communication device of claim 13, wherein the filter module monitors packets and, based on knowledge of applications running on the wireless communication device, automatically generates a block request responsive to an unwanted packet being received.

* * * * *